UNITED STATES PATENT OFFICE.

LEON ORNSTEIN, OF BROOKLYN, NEW YORK.

PROCESS OF MAKING A PAINT OR ENAMEL MATERIAL.

1,222,980.	Specification of Letters Patent.	Patented Apr. 17, 1917.

No Drawing.	Application filed May 1, 1916. Serial No. 94,589.

*To all whom it may concern:*

Be it known that I, LEON ORNSTEIN, a citizen of the United States of America, residing at Brooklyn, in the county of Kings and State of New York, have invented certain new and useful Improvements in Processes of Making a Paint or Enamel Material, of which the following is a specification.

My invention relates to a novel paint and enameling material, and to the process of producing the same. The material contemplated by my invention is an oil-like body, which is capable of being used either alone, or as a grinding oil for pigments.

In practising the invention I employ phenols, or phenolic bodies, and at the initial stage of the process, I polymerize such phenols, the polymerization being effected as described in United States Patent 526,786 to Manasse, and in United States Patent 812,608 to Stephan. The commercial practice of the invention involves the production of two substances, for convenience of description termed substances A and B, their subsequent admixture in suitable proportions, and finally their mixture either separately or together, with about five per cent. of a concentrated solution of a salt, such as chlorid, nitrate, sulfate, or the like, whereby the final product results.

It will be understood that I am not limited to proportions of admixture, to specific kinds of substances used, or to the length of treatment, and with this statement in mind, the following example will enable those skilled in the art to practise the invention.

Substance A.

Dissolve in a suitable tank 100 parts, by volume, of cresol in 100 parts of lye, containing approximately six per cent. of caustic soda, and thoroughly admix therewith seventy-five parts of forty per cent. formaldehyde solution. Allow the mixture to stand for approximately twelve hours, and then gradually add to it one hundred parts of a ten per cent. solution of commercial hydrochloric acid, the mixture being continuously stirred. When this mixture is permitted to settle, substance A precipitates out of the same in the form of a yellowish liquid, heavier than water.

Substance B.

In a suitable tank dissolve one hundred parts, by volume, of cresol in one hundred parts of lye containing approximately six per cent. of caustic soda, then add sixty parts of forty per cent. of formaldehyde solution, stirring the mixture vigorously. Heat the mixture until it comes to a boil, then discontinue heating, and gradually add fifteen additional parts of formaldehyde solution which results in the generation of sufficient heat to continue the boiling for a time. When the boiling subsides, the solution is clear and yellow in color. Add thereto a ten per cent. solution of hydrochloric acid as is done with substance A, and the result is a liquid precipitate which is substance B, resembling substance A, but heavier in body.

Final product.

To obtain the final product substance B is mixed with approximately twenty-five per cent. of substance A, yielding an oil-like body which, when allowed to stand, becomes substantially free from water. I then add about five per cent. of a concentrated solution of an acid salt, which accelerates the hardening of the oil and gives it the desired shade of color, dependent upon the character of acid salt employed. This final product is an excellent medium for grinding with pigment, mixes readily with practically all the solvents used in the manufacture of spirit enamels, and dries hard when baked in a manner common in this art.

When the product is used without pigments, and thinned with any suitable thinning substance, it is adapted for use as a transparent colored enamel.

What I claim as new and desire to secure by Letters Patent is:—

1. The herein described process of manufacturing a paint and enameling material, which consists in forming a mixture of a phenol solution, an alkali, formaldehyde, and a solution of hydrochloric acid, and settling said mixture to obtain an oil-like precipitate therefrom, thereafter forming a mixture of a phenol solution with an alkali and formaldehyde, heating said mixture to the boiling point, adding a quantity of formaldehyde thereto, precipitating an oil-like body out of said second mixture, and finally combining the oil-like precipitates of the first and second mixtures, substantially as described.

2. The herein described process of manufacturing a paint and enameling material, which consists in forming a mixture of a phenol solution, an alkali, formaldehyde, and a solution of hydrochloric acid, settling said mixture to obtain an oil-like precipitate therefrom, thereafter forming a mixture of a phenol solution with an alkali and formaldehyde, heating said mixture to the boiling point, adding a quantity of formaldehyde thereto, precipitating an oil-like body out of said second mixture, combining the precipitates of the first and second mixtures, and finally adding a quantity of acid salt to the final product, substantially as described.

3. The herein described process of manufacturing a paint and enameling material, which consists in admixing an alkaline solution of cresol with formaldehyde and a solution of hydrochloric acid, settling said mixture to obtain an oil-like precipitate, thereafter forming a mixture of an alkaline solution of cresol with formaldehyde and heating such mixture to the boiling point, adding a quantity of formaldehyde to the second mixture and precipitating an oil-like body out of the same, and finally combining the oil-like precipitates of the two mixtures, substantially as described.

4. The herein described process of manufacturing a paint and enameling material, which consists in admixing an alkaline solution of cresol with formaldehyde and a solution of an acid, settling said mixture to obtain an oil-like precipitate, thereafter forming a mixture of an alkaline solution of cresol with formaldehyde and heating such mixture to the boiling point, adding a quantity of formaldehyde to the second mixture and precipitating an oil-like body out of the same, combining the precipitates of the first and second mixtures, and adding a quantity of acid salt to the final product, substantially as described.

5. The herein described process of manufacturing a paint and enameling material, which consists in admixing an alkaline solution of cresol with formaldehyde and a solution of hydrochloric acid, settling said mixture to obtain an oil-like precipitate, thereafter forming a mixture of an alkaline solution of cresol with formaldehyde and heating such mixture to the boiling point, adding a quantity of formaldehyde to the second mixture and precipitating an oil-like body out of the same, combining the oil-like precipitates of the two mixtures and finally adding to the product a thinning medium whereby the same is reduced to brushing consistency.

In testimony whereof I have affixed my signature in presence of two witnesses.

LEON ORNSTEIN.

Witnesses:
OTTO MUNK,
CLARICE FRANCK.